(12) United States Patent
Kim et al.

(10) Patent No.: US 10,582,104 B2
(45) Date of Patent: Mar. 3, 2020

(54) ELECTRONIC DEVICE HAVING CAMERA DEVICE AND METHOD FOR FABRICATING CAMERA DEVICE

(71) Applicant: LG ELECTRONICS INC., Seoul (KR)

(72) Inventors: Jongpil Kim, Seoul (KR); Hakhae Kim, Seoul (KR); Jaewan Hong, Seoul (KR); Dongjin Lee, Seoul (KR); Sungbum Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 32 days.

(21) Appl. No.: 15/961,770

(22) Filed: Apr. 24, 2018

(65) Prior Publication Data

US 2018/0359396 A1    Dec. 13, 2018

(30) Foreign Application Priority Data

Jun. 13, 2017    (KR) .......................... 10-2017-0074384

(51) Int. Cl.
*H04N 5/225*    (2006.01)
*H04M 1/02*    (2006.01)

(52) U.S. Cl.
CPC ........ *H04N 5/2257* (2013.01); *H04M 1/0264* (2013.01); *H04N 5/2253* (2013.01); *H04N 5/2254* (2013.01); *H04M 1/0266* (2013.01)

(58) Field of Classification Search
CPC .... G02B 13/001–006; G02B 13/0075–13/009; H04M 1/0264; H04N 5/2252; H04N 5/2253; H04N 5/2254; H04N 5/2257; H04N 5/2258
See application file for complete search history.

(56) References Cited

U.S. PATENT DOCUMENTS

| | | | |
|---|---|---|---|
| 2011/0007195 A1* | 1/2011 | Fukuta | G02B 13/0025 348/294 |
| 2012/0170923 A1* | 7/2012 | Seo | G02B 13/0035 396/133 |
| 2013/0287383 A1* | 10/2013 | Haruguchi | G03B 3/10 396/133 |
| 2019/0174032 A1* | 6/2019 | Yang | H04N 5/2254 |

* cited by examiner

*Primary Examiner* — Paul M Berardesca
(74) *Attorney, Agent, or Firm* — Lee, Hong, Degerman, Kang & Waimey

(57) ABSTRACT

An electronic device includes a display unit, a bezel portion, and a camera module disposed beneath the bezel portion and provided with a pair of flat surfaces facing each other, wherein the camera module includes a plurality of rim guides each including first and second flat surfaces facing each other, and first and second curved surfaces connecting the first and second flat surfaces, the plurality of rim guides being laminated with forming spaces apart from one another, a plurality of lens portions formed within the plurality of rim guides, respectively, and forming a specific focal length, and an image sensor overlapping the plurality of lens portions and generating an image using light that has passed through the plurality of lens portions.

9 Claims, 4 Drawing Sheets

ELECTRONIC DEVICE HAVING CAMERA DEVICE AND METHOD FOR FABRICATING CAMERA DEVICE

CROSS-REFERENCE TO RELATED APPLICATION

Pursuant to 35 U.S.C. § 119(a), this application claims the benefit of earlier filing date and right of priority to Korean Application No. 10-2017-0074384, filed on Jun. 13, 2017, the contents of which are all hereby incorporated by reference herein in its entirety.

BACKGROUND OF THE INVENTION

1. Field of the Invention

The present invention relates to a mobile terminal having a camera device with a reduced width.

2. Description of the Related Art

Terminals may be divided into mobile/portable terminals and stationary terminals according to their mobility. Also, the mobile terminals may be classified into handheld terminals and vehicle mount terminals according to whether or not a user can directly carry.

Such a terminal has various functions according to development of technologies. For example, a mobile terminal can be allowed to capture still images or moving images (videos), play music or video files, play games, receive broadcast and the like, so as to be implemented as an integrated multimedia player. Efforts are ongoing to support and increase the functionality of mobile terminals. Such efforts include software and hardware improvements, as well as changes and improvements in the structural components.

In recent years, technical researches are being conducted to minimize an area occupied by a bezel portion in order to enlarge an area of a display unit. However, since a plurality of electronic components is disposed in the bezel portion, there is a limit to a reduction of the bezel portion as long as volumes of those components are maintained.

SUMMARY OF THE INVENTION

The present invention is to overcome those problems and other drawbacks, an aspect of the present invention is to provide a camera device having a shape modified (changed) to be disposed beneath a reduced bezel portion.

According to an aspect of the present invention, there is provided an electronic device including a display unit, a bezel portion surrounding the display unit, and a camera module disposed beneath the bezel portion and provided with a pair of flat surfaces facing each other, wherein the camera module includes a plurality of rim guides each including first and second flat surfaces facing each other, and first and second curved surfaces connecting the first and second flat surfaces, the plurality of rim guides being laminated with forming spaces apart from one another, a plurality of lens portions formed within the plurality of rim guides, respectively, and forming a specific focal length, and an image sensor overlapping the plurality of lens portions and generating an image using light that has passed through the plurality of lens portions, wherein the plurality of rim guides include guide grooves and/or guide protrusions, respectively, rotatably inserted into the adjacent rim guides, and wherein one of the pair of flat surfaces facing each other is disposed adjacent to the display unit.

In one embodiment, the guide groove and the guide protrusion may extend along the first and second curved surfaces.

According to an aspect of the present invention, there is provided a method of fabricating an electronic device, including laminating a plurality of lens layers in one direction while assembling circular guide grooves with guide protrusions of the plurality of lens layers, the plurality of lens layers including a plurality of lens portions, respectively, formed at a center thereof, rotating the lens layers such that the plurality of lens portions have a preset focal length, cutting edges of the laminated plurality of lens layers into a flat shape, in a state where the preset focal length is adjusted, separating the plurality of lens layers and interposing spacers between the neighboring plurality of adjacent lens layers, and laminating the plurality of lens layers, with the spacers interposed therebetween, using the guide grooves and the guide projections.

According to the present invention, since an outer surface of a camera device is formed as a flat surface, spaces between the display unit and an outer surface of a terminal body and the camera device can be minimized, thereby reducing a thickness of the bezel portion.

In addition, since an imaginary (mold) area surrounding the lens portion is minimized, volume and weight of the camera device itself can be minimized, so that a weight of the electronic device itself can be reduced and thus power consumption for AF driving can be reduced.

Since a plurality of lens layers are laminated based on cut surfaces in a laminated state, a set focal length can be realized more accurately without additional steps.

DETAILED DESCRIPTION OF THE PREFERRED EMBODIMENT

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
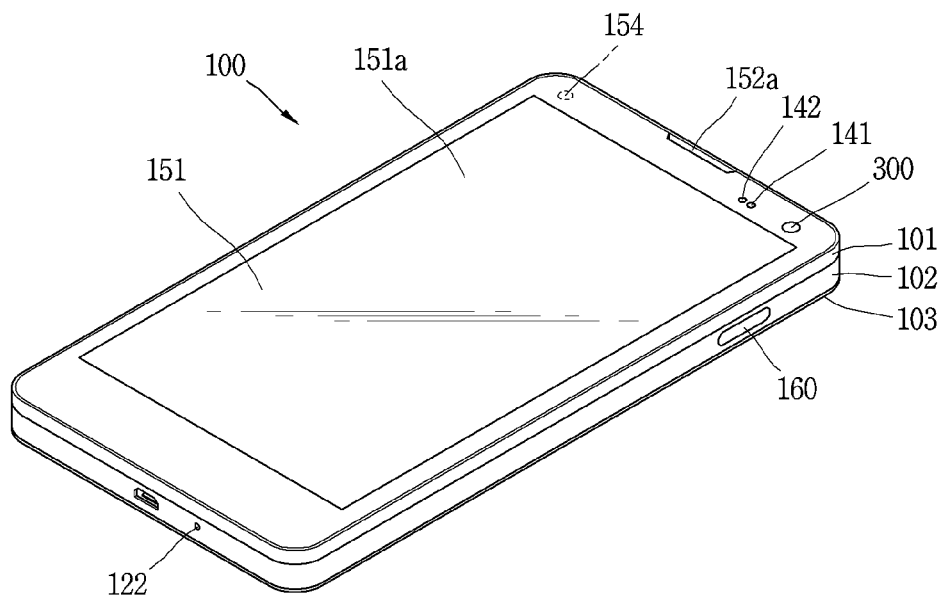
FIGS. 1A and 1B are views of a mobile terminal according to one embodiment of the present invention, viewed from different directions.
Figure 1B:
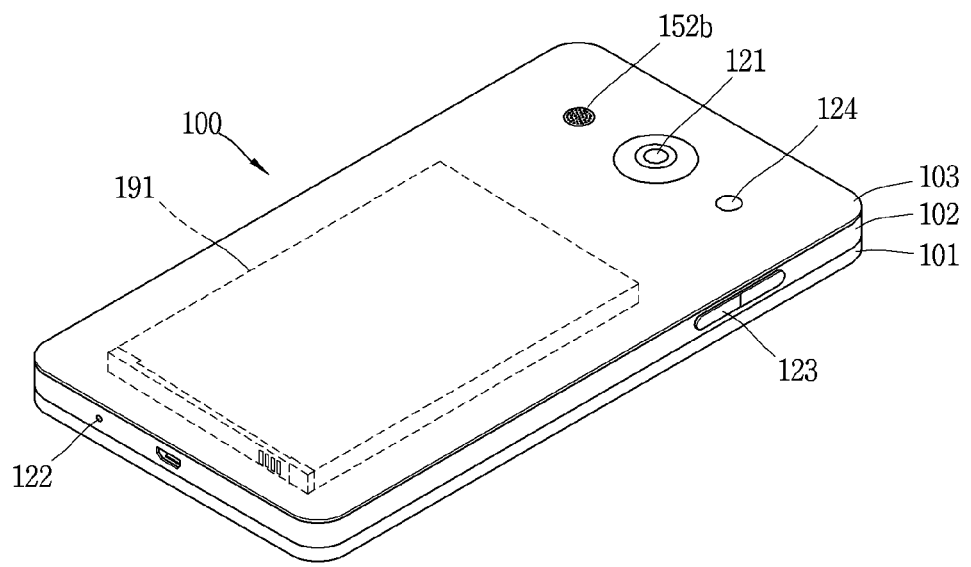

FIGS. 1A and 1B are views of a mobile terminal according to one embodiment of the present invention, viewed from different directions.

Referring to FIGS. 1A and 1B, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (casing, housing, cover, etc.) forming appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121 or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal may include a display unit 151, first and second audio output modules 152a and 152b, a proximity sensor 141, an illumination sensor 142, an optical output module 154, first and second cameras 300 and 121, a user input unit or manipulation unit 123, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, and the first camera 300 are disposed on the front surface of the terminal body, the manipulation unit 123, the microphone 122, and the interface unit 160 are disposed on a side surface of the terminal body, and the second audio output module 152b and the second camera 121 are disposed on a rear surface of the terminal body, with reference to FIGS. 1A and 1B.

However, these components are not limited to this arrangement. These components may be omitted or replaced as needed, or placed on different planes. For example, the manipulation unit 123 may not be disposed on the side surface of the terminal body, and the second audio output module 152b may be disposed on the side surface rather than on the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit. Therefore, the touch screen may replace at least some of functions of the manipulation unit 123. Hereinafter, for the sake of explanation, the display unit (display module) for outputting the image and the touch sensor are collectively referred to as a touch screen 151.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The user input unit 123, which may be manipulated by a user to input a command for controlling the operation of the mobile terminal 100, may include more than one manipulation units. The at least one manipulation unit 123 may also be commonly referred to as a manipulating portion, and may employ any method if it is a tactile manner allowing the user to perform manipulation with a tactile feeling such as touch, push, scroll or the like. The at least one manipulation unit may also be manipulated through a proximity touch, a hovering touch, and the like, without a user's tactile feeling.

Although not shown in the drawings, an additional manipulation unit or a touch key may be disposed on the front surface of the terminal body, but the present disclosure may not be necessarily limited to this. For example, the additional manipulation unit may be configured with a mechanical key, or a combination of a touch key and a push key.

The content received by the at least one manipulation unit may be set in various ways. For example, the additional manipulation unit disposed on the front surface of the terminal body may be used by the user to input a command such as menu, home key, cancel, search, or the like, and the manipulation 123 disposed on the side surface of the terminal body may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the additional manipulation unit located on the front surface of the terminal body. Accordingly, when the additional manipulation unit is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121 may be further mounted to the rear surface of the terminal body. The second camera 121 may have an image capturing direction, which is substantially opposite to the direction of the first camera 300.

The second camera 121 may include a plurality of lenses arranged along at least one line. The plurality of lenses may also be arranged in a matrix configuration. The cameras may be referred to as an 'array camera.' When the second camera 121 is implemented as the array camera, images may be captured in various manners using the plurality of lenses and images with better qualities may be obtained.

A flash 124 may be disposed adjacent to the second camera 121. When an image of a subject is captured with the second camera 121, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit for supplying power to the mobile terminal 100 may be disposed on the terminal body. The power supply unit may include a battery 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear cover 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Referring to FIG. 1A, the main body of the mobile terminal 100 is provided with a bezel portion which surrounds an edge of the display unit 151 and forms an edge of the mobile terminal 100. An image is not output on the bezel portion, and various electronic components and circuits are disposed inside the bezel portion.

The camera device 300 according to the present invention is disposed beneath the bezel portion. The camera device 300 according to the present invention is configured such that surfaces thereof facing each other are cut into flat surfaces, so as to be disposed beneath the bezel portion having a preset width. Hereinafter, a structure of the camera device 300 will be described.

Figure 2A:
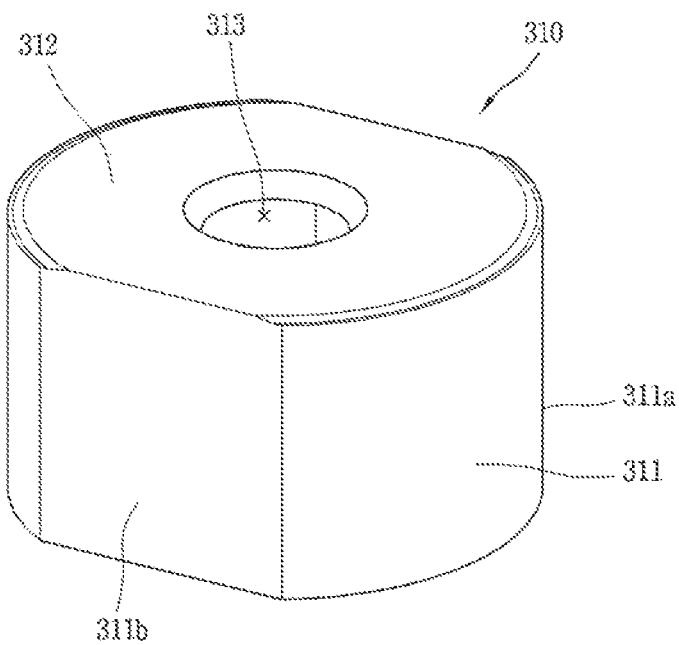
FIG. 2A is a view of a lens cover, viewed in one direction.
Figure 2B:
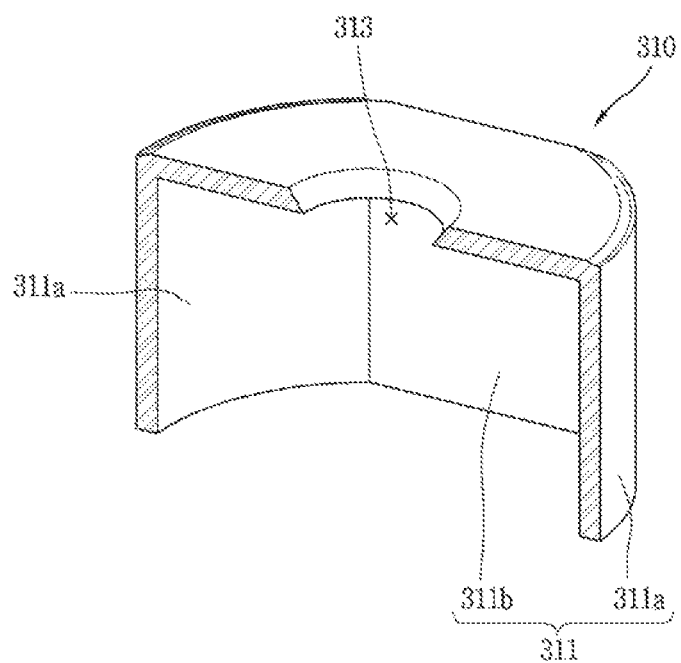
FIG. 2B is a cross-sectional perspective view of the lens cover of FIG. 2A.

FIG. 2A is a planar view of a lens cover, viewed from one direction, and FIG. 2B is a cross-sectional perspective view of the lens cover of FIG. 2A.

Referring to FIGS. 2A and 2B, the lens cover 310 of the present invention forms an outer surface of the camera device 300 and has an inner space for accommodating a plurality of lenses.

A side surface 311 of the lens cover 310 is provided with curved surfaces 311a and flat surfaces 311b. The pair of flat surfaces 311b face each other, and are connected to each other by the pair of curved surfaces 311a. A distance d1 from a virtual center of the lens cover 310 to the flat surface 311b is shorter than the farthest distance d2 from the virtual center to the curved surface 311a.

A thickness of the side surface is substantially uniform, and the inner space of the lens cover 310 is also provided with the flat surfaces and the curved surfaces.

A cover surface 312 is formed on one end portion of the side surface 311. The cover surface 312 is flat, and provided with an opening 313 through which light passes. The opening 313 is formed through a center of the cover surface 312. A plurality of lens layers laminated in one direction are disposed in the inner space of the lens cover 310.

Figure 2C:
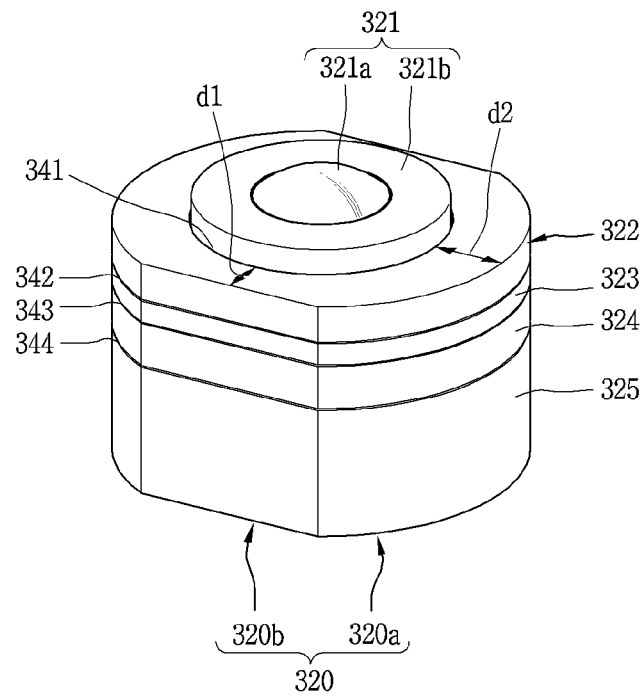
FIG. 2C is a view illustrating a plurality of lens layers disposed inside the lens cover.

FIG. 2C is a view illustrating a plurality of lens layers disposed inside the lens cover.

Referring to FIG. 2C, first to fifth lens layers 321, 322, 323, 324 and 325 are laminated (stacked) in one direction. A side surface of a lens laminate 320 including the first to fifth lens layers 321, 322, 323, 324 and 325 is provided with a pair of curved surfaces 320a and a pair of flat surfaces 320b. Each side surface of the second to fifth lens layers 322, 323, 324, and 325 forms the pair of curved surfaces 320a and the pair of flat surfaces 320b, and has substantially the same cross section. However, a size of the first lens layer 321 is smaller than those of the second to fifth lens layers 322, 323, 324 and 325, and the first lens layer 321 is arranged on a center of the second lens layer 322. For example, a diameter of the first lens layer 321 is formed to be smaller than or equal to a distance between the pair of flat surfaces.

First to fourth spacers 341, 342, 343 and 344 are inserted into spaces between the neighboring first to fifth lens layers 321, 322, 323, 324 and 325, respectively, to maintain the spaces and absorb impacts. The first to fourth spacers 341, 342, 343 and 344 are formed to correspond to shapes of edges of the second to fifth lens layers 322, 323, 324 and 325, and thus each may be provided with a pair of curved lines and a pair of straight lines.

The first to fifth lens layers 321, 322, 323, 324 and 325 may include first to fifth rim guides 321b, 322b, 323b, 324b and 325b, and first to fifth lens portions 321a, 322a, 323a, 324a, and 325a, respectively.

Figure 3A:
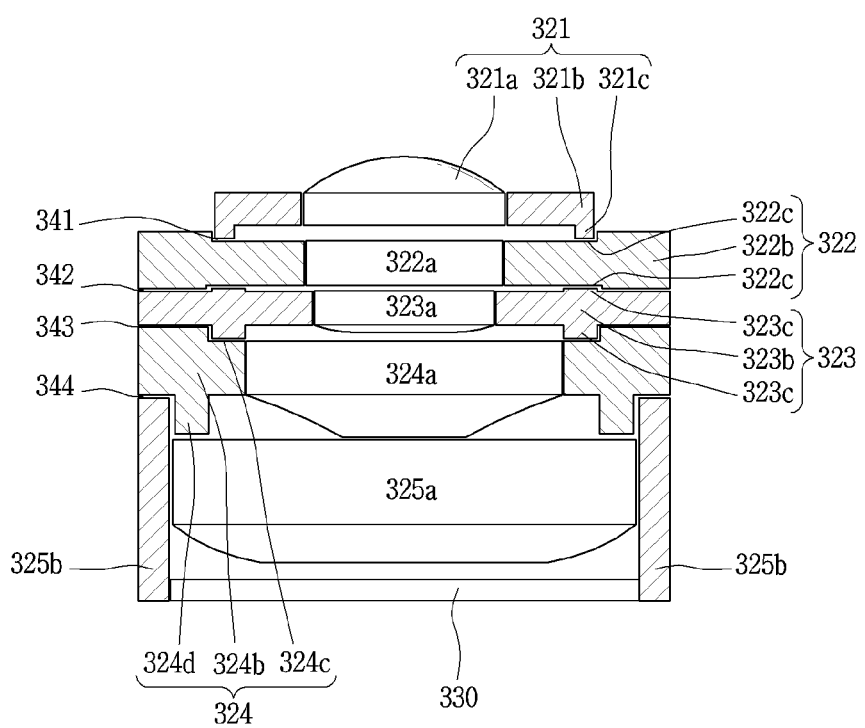
FIG. 3A is a cross-sectional view of a lens laminate.

FIG. 3A is a cross-sectional view of a lens laminate.

The first to fifth rim guides 321b, 322b, 323b, 324b and 325b are formed to enclose the lens portions 321a, 322a, 323a, 324a, and 325a, respectively. The lens portion and the rim guide which form one lens layer are integrally formed with each other. That is, an area of the lens layer, which refracts light to be transmitted to the next lens layer, corresponds to an effective area, while an area which surrounds the effective area without transmitting light and supports another lens layer corresponds to an imaginary area (molding area).

The lens portion is formed to refract light with a specific curvature, and the rim guide is formed along the edge of the lens portion to support the lens portion. An image sensor 330 is formed below the fifth lens layer 325. Light reaches the image sensor 330 sequentially through the first to fifth lens portions 321a, 322a, 323a, 324a and 325a.

The image sensor 330 is formed such that horizontal and vertical lengths have a specific ratio. The specific ratio may be 4:3 or/and 16:9. A size of the lens layer overlaps the entire image sensor 330. That is, the flat surface areas of the lens layers are arranged to correspond to a long edge of the image sensor 330.

Centers of the second to fifth lens portions 322a, 323a, 324a and 325a are arranged along one direction in a state where the second to fifth rim guides 322b, 323b, 324b and 325b are laminated.

The first lens layer 321 is also formed to be relatively smaller than the other lens layers and is disposed on the second lens layer 322 to be arranged along the one direction.

Each of the first to fifth rim guides 321b, 322b, 323b, 324b and 325b is provided with at least one guide protrusion and/or guide groove. The guide protrusions or the guide grooves are formed in a corresponding manner, respectively, on surfaces of the first to fifth rim guides 321b, 322b, 323b, 324b, and 325b facing one another.

For example, the first rim guide 321b includes a guide protrusion 321c that is adjacent to an outer circumferential surface thereof and protrudes toward the second rim guide 322b, and the third rim guide 323 includes guide protrusions 323c which protrude toward the second and fourth rim guides 322b and 324b, respectively.

The second rim guide 322b includes guide grooves 322c recessed into both surfaces thereof to receive the guide protrusion 321c of the first rim guide 321b and the guide protrusion 323c of the third rim guide 323b.

The fourth rim guide 324b includes a guide groove 324c formed on one surface thereof, and a guide protrusion 324d formed on another surface and disposed to intersect with an end portion of the fifth rim guide 325b. The first to fifth rim guides 321b, 322b, 323b, 324b and 325b are laminated by being engaged with one another by the respective guide grooves and guide protrusions.

The guide grooves and the guide protrusions are formed along the pair of curved surfaces.

Each of the first to fifth rim guides 321b, 322b, 323b, 324b and 325b forms a belt shape of surrounding the corresponding lens portion so that the first to fifth lens layers 321, 322, 323, 324, and 325 relatively rotate. When the flat surfaces of the respective lens layers are arranged in parallel to one another (i.e., arranged to be flush with one another), the first to fifth lens layers 321, 322, 323, 324 and 325 may be aligned in a rotating manner such that the lens portions included in the respective first to fifth lens layers 321, 322, 323, 324 and 325 form a preset focal length (focal distance).

The first to fifth lens layers 321, 322, 323, 324 and 325 are detachable from one another. When the first to fifth lens layers 321, 322, 323, 324 and 325 are assembled again by the guide grooves and the guide protrusions, the first to fifth lens portions 321a, 322a, 323a, 324a and 325a are aligned into an initial state, and the preset focal length is adjusted again.

Figure 3B:
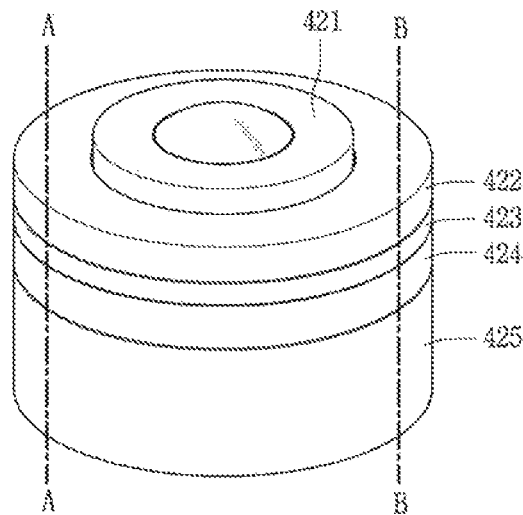
FIGS. 3B and 3C are views of lens layers laminated before being cut.
Figure 3C:
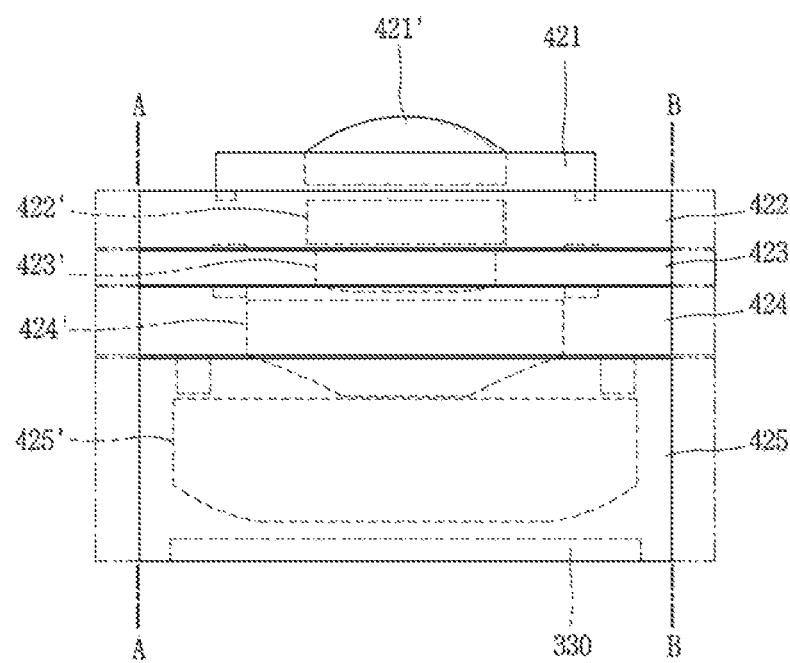

FIGS. 3B and 3C are views of laminated lens layers before being cut.

Each of first to fifth initial lens layers 421, 422, 423, 424 and 425 has a curved edge, and a laminate thereof is cylindrical. However, a diameter of the first initial lens layer 421 is relatively small.

The first to fifth initial lens layers 421, 422, 423, 424 and 425 also include guide grooves and guide protrusions for supporting one another, respectively. The guide grooves and guide protrusions are formed in a circular shape with respect to a central point, and thus the first to fifth initial lens layers 421, 422, 423, 424 and 425 are relatively rotatable while the guide protrusions are inserted into the guide grooves. That is, the guide grooves and the guide protrusions are formed along edges of the first to fifth initial lens layers 421, 422, 423, 424 and 425 so as to have a circular shape.

The preset focal length of the camera device 300 is realized through the relative rotation of each of the first to fifth initial lens layers 421, 422, 423, 424 and 425. When the preset focal length is realized, the first to fifth initial lens layers 421, 422, 423, 424, and 425 are cut along the lines A-A and B-B. The lines A-A and B-B may correspond to directions corresponding to long edges of the image sensor 330.

The lines A-A and B-B are set to include an entire effective area of the fifth initial lens layer 425 which is the largest effective area and to form a size covering the image sensor 330.

The second to fifth initial lens layers 422, 423, 424 and 425 having a pair of flat edges and a pair of curved edges are realized as the second to fifth lens layers 322, 323, 324 and 325, and the first initial lens layer 421 which is not cut is realized as the first lens layer 321 without deformation.

The second to fifth initial lens layers 422, 423, 424 and 425 cut along the lines A-A and B-B and the first initial lens layer 421 are assembled by the guide grooves and guide protrusions after being separated. Therefore, since the lens portions included in the first to fifth initial lens layers 421, 422, 423, 424 and 425 are aligned into a state before being cut, the set focal length is realized without an additional adjustment.

Accordingly, the spacers are inserted between the neighboring first to fifth lens layers 421, 422, 423, 424 and 425 after being cut.

Although not illustrated in the drawing, the lens cover 310 is assembled to cover the laminate of the first to fifth lens layers 421, 422, 423, 424 and 425.

Referring back to FIG. 1A, the pair of flat surfaces of the camera device 300 are disposed adjacent to the display unit 151 and the side surface of the terminal main body. Accordingly, spaces between the display unit 151 and the outer surface of the terminal body and the camera device 300 can be minimized. Therefore, a thickness of the bezel portion surrounding the display unit 151 can be minimized.

Also, since the lens portions can be accurately aligned by the guide protrusions and the guide grooves of the rim guides, and parts of the unnecessary imaginary areas for assembling the lens portions except the effective areas are cut, volume and weight of the camera device 300 can be minimized.

In addition, as the weight of the lens layer decreases, power consumption due to driving an AF actuator disposed to adjust the focal length is reduced.

In the present invention, it has been described that the camera device 300 has the pair of flat surfaces. However, according to another embodiment of the present invention, the lens cover 310 and the laminate of the lens layers may have a single flat surface. In this case, the one flat surface is disposed adjacent to the display unit 151 or adjacent to the outer surface of the terminal main body.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electronic device, comprising:
a display unit;
a bezel portion surrounding the display unit; and
a camera module disposed on the bezel portion and having a pair of flat surfaces facing each other,
wherein the camera module comprises:
a plurality of rim guides, each rim guide including first and second flat surfaces facing each other, and first and second curved surfaces connecting the first and second flat surfaces, the plurality of rim guides being laminated with forming spaces apart from one another;
a plurality of spacers, each spacer interposed between neighboring rim guides among the plurality of rim guides;
a plurality of lens portions, each lens portion formed within a respectively corresponding one of the plurality of rim guides and forming a specific focal length; and
an image sensor overlapping the plurality of lens portions and generating an image using light that has passed through the plurality of lens portions,
wherein each of the plurality of rim guides includes at least one of a guide groove or a guide protrusion rotatably inserted into the neighboring rim guides,
wherein each of the plurality of spacers comprises curved lines corresponding to the first and second curved surfaces, and straight lines corresponding to the first and second flat surfaces, and
wherein one of the pair of flat surfaces facing each other is disposed adjacent to the display unit.

2. The device of claim 1, wherein the guide groove and the guide protrusion extend along the first and second curved surfaces.

3. The device of claim 1, wherein the image sensor comprises first and second surfaces having different lengths, and
wherein the first and second flat surfaces are disposed in parallel with a first long surface of the first and second surfaces.

4. The device of claim 1, wherein a diameter of one of the plurality of rim guides is shorter than or equal to a distance between the first and second flat surfaces.

5. The device of claim 1, wherein the camera module further comprises a lens cover enclosing outer surfaces of the plurality of rim guides, and
wherein the lens cover includes a pair of flat surfaces corresponding to the pair of flat surfaces of the rim guide.

6. A method for fabricating an electronic device, comprising:
laminating a plurality of lens layers in one direction while assembling circular guide grooves with guide protrusions of the plurality of lens layers, the plurality of lens layers including a plurality of lens portions, respectively, formed at a center thereof;
rotating the lens layers such that the plurality of lens portions have a preset focal length;
cutting edges of the laminated plurality of lens layers into flat surfaces, in a state where the preset focal length is adjusted;
separating the plurality of lens layers and interposing spacers between neighboring lens layers among the plurality of lens layers; and
laminating the plurality of lens layers, with the spacers interposed therebetween, using the guide grooves and the guide projections.

7. The method of claim 6, further comprising mounting a lens cover to enclose the plurality of lens layers,
wherein the lens cover includes a pair of flat surfaces facing each other.

8. The method of claim 6, further comprising mounting an image sensor having first and second surfaces with different lengths,
wherein the second surface which is longer of the first and second surfaces is disposed adjacent to the flat surfaces.

9. The method of claim 6, wherein the cut flat surfaces of the plurality of lens layers are arranged in parallel by laminating the plurality of lens layers with the spacers interposed therebetween by using the guide grooves and the guide protrusions.

* * * * *